United States Patent [19]

Kolberg

[11] Patent Number: 4,641,560
[45] Date of Patent: Feb. 10, 1987

[54] PORTABLE SELF-POWERED BAND SAW

[76] Inventor: William Kolberg, 709 Lincoln Ave., Green Bay, Wis. 54303

[21] Appl. No.: 806,607

[22] Filed: Dec. 9, 1985

[51] Int. Cl.[4] .............................................. B23D 55/06
[52] U.S. Cl. ....................................... 83/788; 83/523; 74/13
[58] Field of Search .......... 83/788, 790, 792, 802–820, 83/523, 574; 74/13–15, 11; 280/289 R, 293, 295, 296

[56] References Cited

U.S. PATENT DOCUMENTS

Re. 14,609   3/1919  Parmenter ................................. 74/13
192,810      7/1877  Millward .................................. 83/810
620,893      3/1899  Dickinson .............................. 74/13 X Primary Examiner—James M. Meister
Attorney, Agent, or Firm—Ronald E. Barry

[57] ABSTRACT

A portable band saw assembly adapted to be driven by the rear wheel of a bicycle, the assembly including a base having a frame assembly for supporting a continuous saw blade mounted on a pair of grooved wheels, a wheel guide assembly having wheel rim stabilizing assemblies for supporting the rear wheel of the bicycle and a sprocket hub support including a bracket for camming the rear wheel of the bicycle into engagement with one of the saw blade wheels.

7 Claims, 4 Drawing Figures

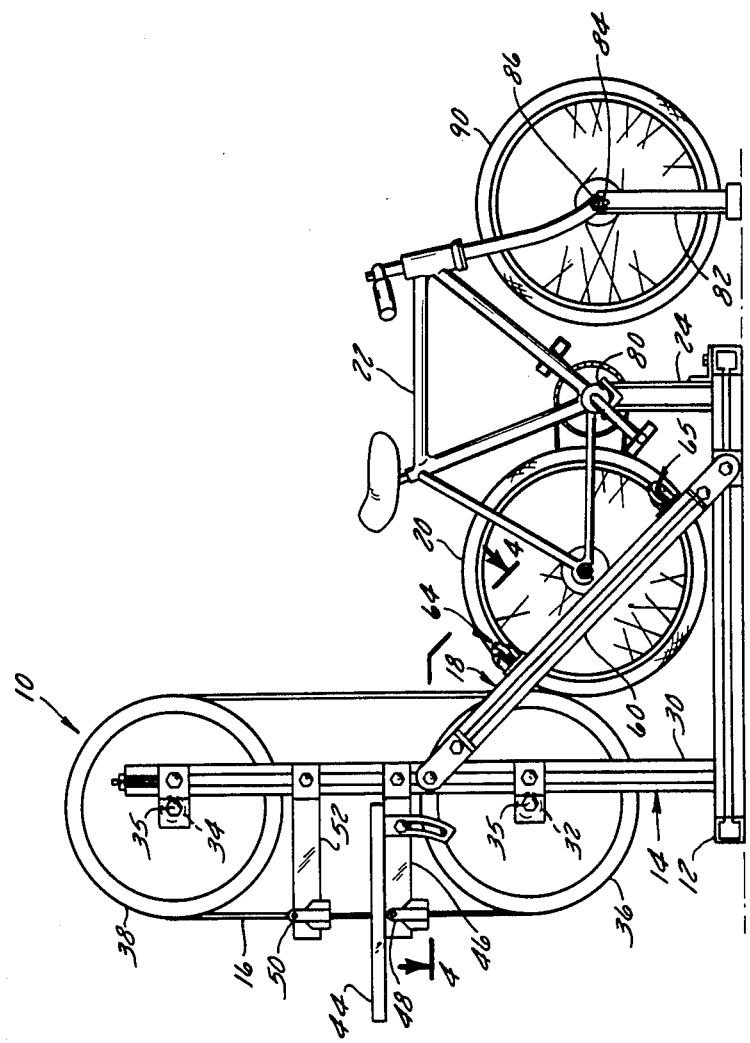
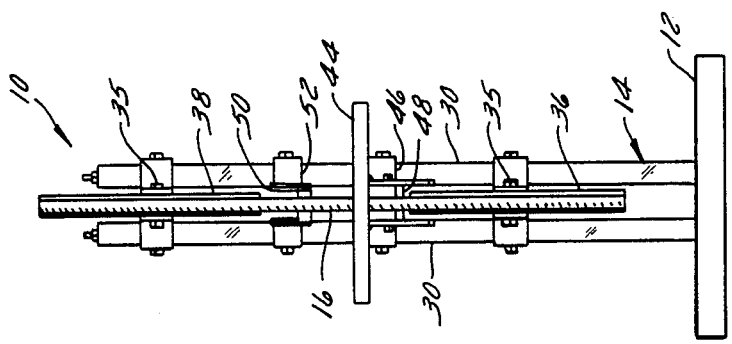

PORTABLE SELF-POWERED BAND SAW

BACKGROUND OF INVENTION

The increased interest in outdoor activities by sports enthusiasts has resulted in an increase in the use of bicycles, both for travel and exercise. The latter can also be attained by riding a bicycle both outdoors and indoors in a stationary position. The energy expended when pedaling a bicycle in a stationary position can be used to drive various types of tools and at the same time achieve the benefits of physical exercise.

SUMMARY OF THE INVENTION

The invention of the present application relates to a device which can be used both for exercise as well as a drive for a band saw. This has been achieved by using the bicycle as the primary source of power for a portable band saw. The bicycle can be quickly and easily mounted in the frame for the band saw. The bicycle may be stabilized so that an operator can exercise at the same time that the band saw is being operated.

BRIEF DESCRIPTION OF THE DRAWINGS

The invention may be better understood, and further advantages and uses thereof will be more readily apparent, when the following detailed description of exemplary embodiments is read in connection with the accompanying drawings, in which:

FIG. 1 is a side elevation view of the band saw with a bicycle mounted on the frame.

FIG. 2 is a front view of the band saw.

DESCRIPTION OF THE INVENTION

Figure 4:
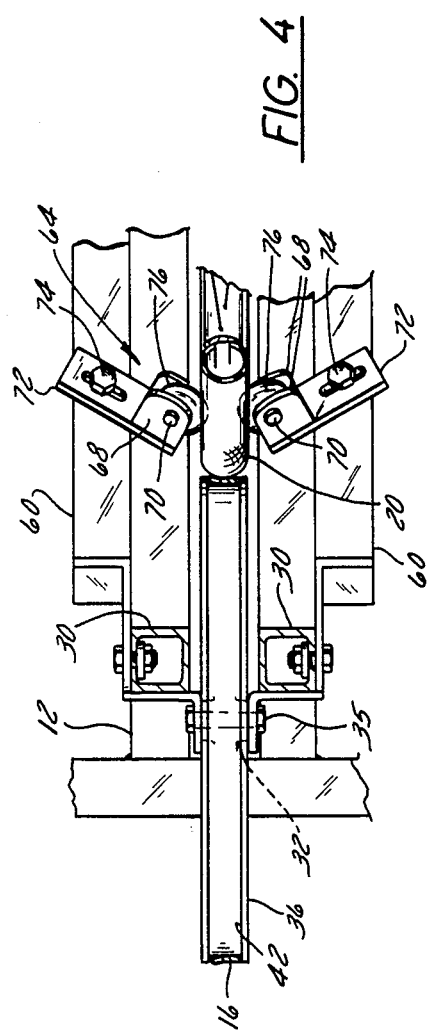
FIG. 4 is an enlarged view taken on line 4—4 of FIG. 1 showing the bicycle wheel mounted in the band saw frame.
Figure 3:
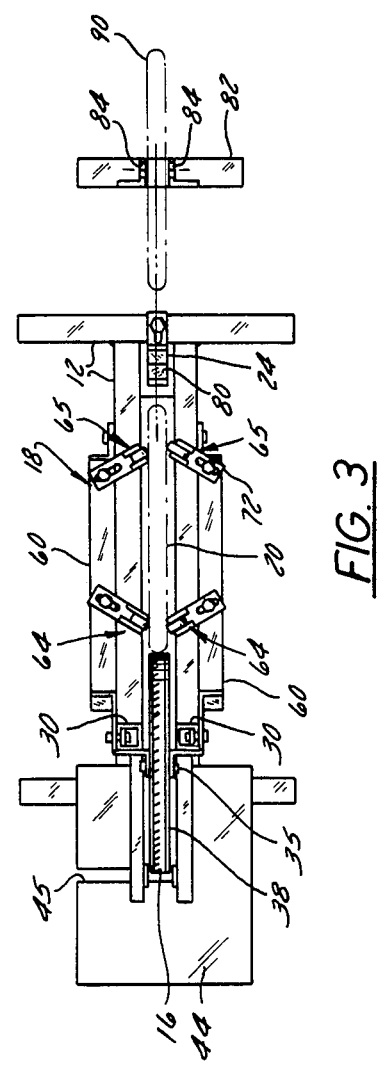
FIG. 3 is a top view of the band saw with the bicycle removed.

Referring to FIG. 1, the portable band saw 10 generally includes a base 12 having a vertical frame assembly 14 to support a band saw 16 and a wheel guide assembly 18 arranged to receive the rear wheel 20 of bicycle 22. The bicycle 22 is seated on a sprocket support 24 provided on the base 12 which cams the rear wheel of the bicycle into frictional engagement with the band saw 16. Once the bicycle has been firmly seated in the sprocket support, it can be used to drive the band saw 16.

The frame assembly 14 includes two vertical support columns 30 mounted on the base 12 in a parallel-spaced relation to each other. A pair of axle hubs 32 and 34 are located in a vertically spaced relation on the columns 30 to support the wheel axles 35. A pair of wheels 36 and 38 are mounted on the axles 35 with the band saw 16 mounted on the outer peripheral of the wheels. Each wheel is provided with a groove 42 to maintain the saw blade 16 in alignment on the wheels 36, 38. The wheels should be made of sufficient weight to provide sufficient inertia to maintain a steady rate of speed of the band saw when driven by the bicycle.

Means are provided on the top of the columns 30 for adjusting the distance between the axle hubs 32 and 34. Such means is in the form of a threaded rod 33 connected to the hub 34 and a nut 37. The nut 37 is mounted on the rod 33 and rests on the top of column 30. Rotation of the nut 37 will raise hub 34 to tighten the saw blade 16.

A work table 44 having a slot 45 in the center is supported on the columns 30 by means of a bracket 46. A pair of guides 48 and 50 are supported on brackets 46 and 52 respectively to align the saw blade 16 with the slot 45 in work table 44.

Means are provided to align the rear wheel 20 of the bicycle 22 with the lower wheel 36 of the band saw 16. Such means is in the form the wheel guide assembly 18 which includes a pair of wheel guide bars 60 mounted in a parallel-spaced relation between the base 12 and the columns 30. Means in the form of two pair of roller assemblies 64 and 65 are mounted on each of the bars 60 in a position to engage the inside of the rim of the rear wheel 20 for the bicycle. In this regard, each roller assembly includes a pair of brackets 68 mounted in a parallel spaced relation on a plate 72. A pivot pin 70 is supported by each pair of brackets 68. The plates 72 include a mounting slot 73. The plates 72 are adjustably supported on the bars 60 by means of bolts 74 which are aligned with the slots 73 and screwed into threaded openings in bars 60. Rollers 76 are mounted on the pivot pins 70. The plates 72 are adjusted to place the rollers 76 in a position to engage the rim of the wheel. With this arrangement, the wheel guide assembly can be adjusted to accommodate different size wheels.

The bicycle is supported on the base by the vertical sprocket hub support 24 which includes support bracket 80 at the upper end. The V-bracket includes means for camming the rear wheel 20 into frictional engagement with the lower band saw wheel. Such means is in the form of a V-slot 85 in the bracket 80.

Means are also provided to horizontally adjust the hub support 24 on the base 12 to accommodate different size bicycles. Such means is in the form of an angle iron 25 having a slot 27 and a bolt 29 aligned in the slot 27. The support should be set at a distance from the lower band saw wheel slightly less than the distance between the tire on the rear wheel and the sprocket hub. The sprocket hub when seated in the V-slot will be cammed rearward to seat the tire on the wheel 36.

Means can also be provided to stabilize the front wheel 90 when the bicycle is mounted on the frame. Such means is in the form of a support column 82 having a notch 84 at the upper end to engage the front axle 86 on the bicycle to assure stability at the front of the bicycle.

The embodiments of the invention in which an exclusive property or privilege is claimed, are defined as follows:

1. A portable saw assembly comprising a base, a frame assembly mounted on said base, a pair of wheels mounted on said frame in a common plane, a continuous band saw mounted on said wheels, a wheel guide assembly mounted on said base to define a bicycle wheel support, a sprocket support member mounted on said base in a spaced relation to said guide assembly whereby a bicycle supported on said sprocket member with the rear wheel aligned in said guide assembly will bear on said saw blade wheel and can be used to drive the saw blade wheels.

2. The saw assembly according to claim 1, wherein said wheel guide assembly includes a pair of guide bars connected between said frame and said base in a parallel spaced relation and roller means mounted on said guide bars in a position to engage the inside of the rim of a bicycle wheel to thereby stabilize the wheel.

3. The saw assembly according to claim 2 wherein said sprocket support member includes means for camming the rear wheel into engagement with said saw blade wheel.

4. The saw assembly according to claim 3 wherein said camming means comprising a "V"-slot for supporting the wheel sprocket hub.

5. A portable saw assembly adapted be driven by the rear wheel of a bicycle, said assembly comprising a base, a pair of columns mounted on said base, a pair of wheels supported on said columns, each of said wheels including a peripheral groove, a continuous saw blade mounted on said wheels and aligned in said groove, a wheel guide assembly connected between said columns and said base, said guide assembly including a pair of bars mounted in a parallel spaced relation and a pair of roller assemblies mounted on each of said bars in a position to engage the inside of the rim of a bicycle wheel and means mounted on the bars for supporting the bicycle sprocket hub in a position where the rear wheel will bear against one of the saw blade wheels.

6. The saw assembly according to claim 5 wherein said hub support means includes a V-bracket for camming the bicycle toward the band saw and including means for adjustably securing said support means on said base whereby said bicycle will be cammed rearward into engagement with said saw blade wheel.

7. The saw assembly according to claim 6 including means for supporting the front axle of the bicycle.

* * * * *